United States Patent

Killpatrick et al.

[11] Patent Number: 5,486,920
[45] Date of Patent: Jan. 23, 1996

[54] LASER GYRO DITHER STRIPPR GAIN CORRECTION METHOD AND APPARATUS

[75] Inventors: Joseph E. Killpatrick, Minneapolis; Dale F. Berndt, Plymouth; Keith R. Fritze, Long Lake; Gregory E. Cary, Mounds View, all of Minn.

[73] Assignee: Honeywell, Inc., Minneapolis, Minn.

[21] Appl. No.: 137,669

[22] Filed: Oct. 1, 1993

[51] Int. Cl.$^6$ ............................................. G01C 19/66
[52] U.S. Cl. ............................................. 356/350
[58] Field of Search ............................ 356/350; 372/94

[56] References Cited

U.S. PATENT DOCUMENTS

| | | | |
|---|---|---|---|
| 3,373,650 | 3/1968 | Killpatrick . | |
| 4,248,534 | 2/1981 | Elbert | 356/350 |
| 4,344,706 | 8/1982 | Ljung et al. | 356/350 |
| 4,529,311 | 7/1985 | Morgan et al. | 356/350 |
| 4,610,543 | 9/1986 | Ferriss . | |
| 4,751,718 | 6/1988 | Hanse et al. . | |
| 5,225,889 | 7/1993 | Fritze et al. | 356/350 |
| 5,249,031 | 9/1993 | Fritze et al. | 356/350 |

FOREIGN PATENT DOCUMENTS

| | | |
|---|---|---|
| 8804767 | 6/1988 | European Pat. Off. . |
| 9106828 | 5/1991 | European Pat. Off. . |

*Primary Examiner*—Samuel A. Turner
*Attorney, Agent, or Firm*—Thomas A. Rendos

[57] ABSTRACT

A sampling method and apparatus for sampling a dither signal includes the step of sensing a number of peak amplitudes $P_1, P_2, P_3 \ldots P_n$ each of the number of peak amplitudes having a corresponding times $t_1, t_2, t_3 \ldots t_n$ while simultaneously sensing a number of ring laser gyro output angles at each of the corresponding times $t_1, t_2, t_3 \ldots t_n$. A value of the gyro net output, $\Delta\phi$, is calculated as $\Delta\phi=(\phi_n-\phi_{n-1})-(\alpha_n-\alpha_{n-1})K$, where K is a correction factor. Alternatively, the stripped gyro angle output may be calculated as $\phi_g=\phi_n-\alpha_n K$. Where $\phi_g$ is substantially equivalent to the sum of all of the changes in the stripped gyro angle, that is the sum of all $\Delta\phi$'s. The correction may include corrections for gain, phase angle, nonlinearity, temperature bias and scale factors.

22 Claims, 6 Drawing Sheets

5,486,920

LASER GYRO DITHER STRIPPR GAIN CORRECTION METHOD AND APPARATUS

This invention relates generally to a method and apparatus for removing the dither signal component from the inertial output of a laser gyro and more particularly to a method and apparatus for dither stripper gain correction.

BACKGROUND OF THE INVENTION

Ring laser angular rate sensors, also called laser gyros, are well known in the art. One example of a ring laser angular rate sensor is U.S. Pat. No. 4,751,718 issued to Hanse, et al., which is incorporated herein by reference thereto. Present day ring laser angular rate sensors include a thermally and mechanically stable laser block having a plurality of formed cavities for enclosing a gap. Mirrors are placed at the extremities of the cavities for reflecting laser beams and providing an optical closed-loop path.

Associated with such sensors is an undesirable phenomenon called lock-in which has been recognized for some time in the prior art. During lock-in the counter-propagating laser beams tend to lock together to a common frequency. To avoid or reduce the effects of lock-in, the ring laser gyro may be biased by an alternating bias technique such as that shown and described in U.S. Pat. No. 3,373,650 issued in the name of J. E. Killpatrick. The alternating bias technique is usually referred to as dithering, and may be implemented by a variety of ways including electro-optical and mechanical schemes. Since dithering, by either of these mentioned techniques and the like, directly affects the behavior of the counter-propagating laser beams, the sensor readout signal will contain not only inertial rate information, but will also contain a signal component directly related to the dithering, or alternating bias, of the sensor.

Dither motors of the prior art usually have a suspension system which includes, for example, an outer rim, a central hub member and a plurality of three dither motor reeds which project radially from the hub member and are connected between the hub member and the rim. Conventionally, a set of piezo-electric elements is connected to the suspension system. The set of piezo-electric elements serves as an actuator. When actuated through the application of an electrical signal to the piezo-electric elements, the suspension system operates as a dither motor which causes the block of the sensor to oscillate angularly at the natural mechanical resonant frequency of the suspension system. This dither motion is superimposed upon the inertial rotation of the sensor in inertial space. Such dither motors may be used in connection with a single laser gyro, or to dither multiple laser gyros. The prior art includes various approaches to recover inertial rotation data free from dither effects.

In situations where the gyro is mounted to an inertial platform or mounting base, and mechanical dithering is applied, the gyro output comprises the sum of the base angular motion and the gyro dither motion relative to the mounting base. This is true whether the sensor readout is mounted directly on the sensor, as in the case of a laser block mounted sensor readout, or fixed relative to the sensor mounting base like that shown in the aforementioned patent.

The signal contribution in the sensor readout signal due to the alternating bias is herein referred to as the dither signal component. For low noise navigational systems, the dither signal component in the readout signal generally needs to be minimized or removed to avoid control problems, particularly in block mounted readout systems.

Prior art solutions to remove the dither signal component include notch filters and fast fourier transforms. However, such techniques generate gain and phase shift disturbances which can affect the stability of any control loops or any readout signal processing systems. Another solution utilizes a digital pulse subtraction technique as taught in U.S. Pat. No. 4,248,534, issued to Elbert. A desirable solution is to remove the dither signal component by generating a correction signal which is substantially equivalent to the dither signal component. This latter approach is taught in U.S. Pat. No. 4,344,706 issued to Ljung et al. Ljung et al. teaches the use of a tracking circuit for tracking the clockwise and counterclockwise components of dither rotation. These dither components are subtracted from the usual readout signal which is responsive to the counter-propagating laser beams of the sensor thereby providing a corrected readout signal.

Another technique is to strip the dither signal component by an electronic dither compensator as taught in U.S. Pat. No. 4,610,543 issued to Ferriss. This patent illustrates an up/down count technique for a ring laser gyro readout mechanization in which readout output counts due to dither are subtracted from the readout output count in order to provide a corrected readout count.

The Ferriss patent also shows a closed-loop feedback method of reducing the dither component in the system readout signal. In Ferriss, a dither correction signal is subtracted from the gyro readout signal to derive a corrected sensor output signal. Closed loop correction is provided by generating the dither correction signal as a function of a dither reference signal representative of the dithering or alternating bias, and the relationship between the correction signal and the dither reference signal is controlled as a function of any dither signal component in the corrected sensor output signal.

Recently a modular Ring Laser Gyro (RLG) employing a microprocessor for control has been developed by Honeywell Inc. of Minneapolis, Minn., USA. Such a microprocessor controlled RLG requires highly precise stripped dither data to an accuracy of 1 to 2 counts from the readout of the modular RLG.

For a modular RLG it is advantageous that the dither stripping be done in response to external commands, that is, commands from outside of the modular RLG. If dither stripping is not done in response to external commands, the system frequency may be an exact sub-multiple of the dither frequency. In such a rare case, the dither stripper apparatus may not receive data allowing it to run accurately. Further, if the system frequency is close to a sub-multiple of the dither frequency, a very severe loss of gain may occur. Further still, loop gains, time constants, and other operational parameters are all dependent upon system request frequencies thus making design of an RLG having wide capabilities very difficult unless dither stripping commands are generated externally to avoid having timing which is close to system frequencies.

SUMMARY OF THE INVENTION

In one aspect of the invention a sampling method and apparatus for sampling a dither signal is disclosed. The method comprises the step of sensing a plurality of peak amplitudes $P_1, P_2, P_3 \ldots P_n$ each of the plurality of peak amplitudes having a corresponding times $t_1, t_2, t_3 \ldots t_n$ while simultaneously sensing a plurality of ring laser gyro output angles at each of the corresponding times $t_1, t_2, t_3 \ldots t_n$. A value of the change in stripped gyro angle, $\Delta\phi$, is calculated as $\Delta\phi=(\phi_n-\phi_{n-1})-(\alpha_n-\alpha_{n-1})K$, where K is a correction factor. K may include correction coefficients for gain, phase angle, nonlinearity, temperature bias and scale factors. In the aforesaid relationship, the subscript "n" corresponds to a value at time $t_n$.

Alternatively, the stripped gyro angle output may be calculated as $\phi=\phi_n-\alpha_n K$.

In another aspect of the invention, the method further comprises the step of summing values of $\Delta\phi$ with the sign of $\alpha_n$ into an integrator to correct the value of K.

In another embodiment of the invention, the dither stripper apparatus of the invention comprises a stripping apparatus that senses a dither analog signal from a dither pick-off. The dither analog signal is converted to a digital form and is compensated by a closed loop system to adjust the signal gain.

It is one motivation of the present invention to provide stripped data which is free of any synchronization constraints with outside commands.

It is another motive of the present invention to provide a dither stripping apparatus which substantially operates at a maximum sensitivity for all measurements with a maximum positive measurement followed by a maximum negative measurement value and vice versa.

The present invention advantageously provides a dither stripper which is much more robust and less sensitive to input noise than prior art devices while having much faster response time.

Other objects, features and advantages of the present invention will become apparent to those skilled in the art through the Description of the Preferred Embodiment, Claims, and drawings herein wherein like numerals refer to like elements.

DESCRIPTION OF THE PREFERRED EMBODIMENT

Figure 1:
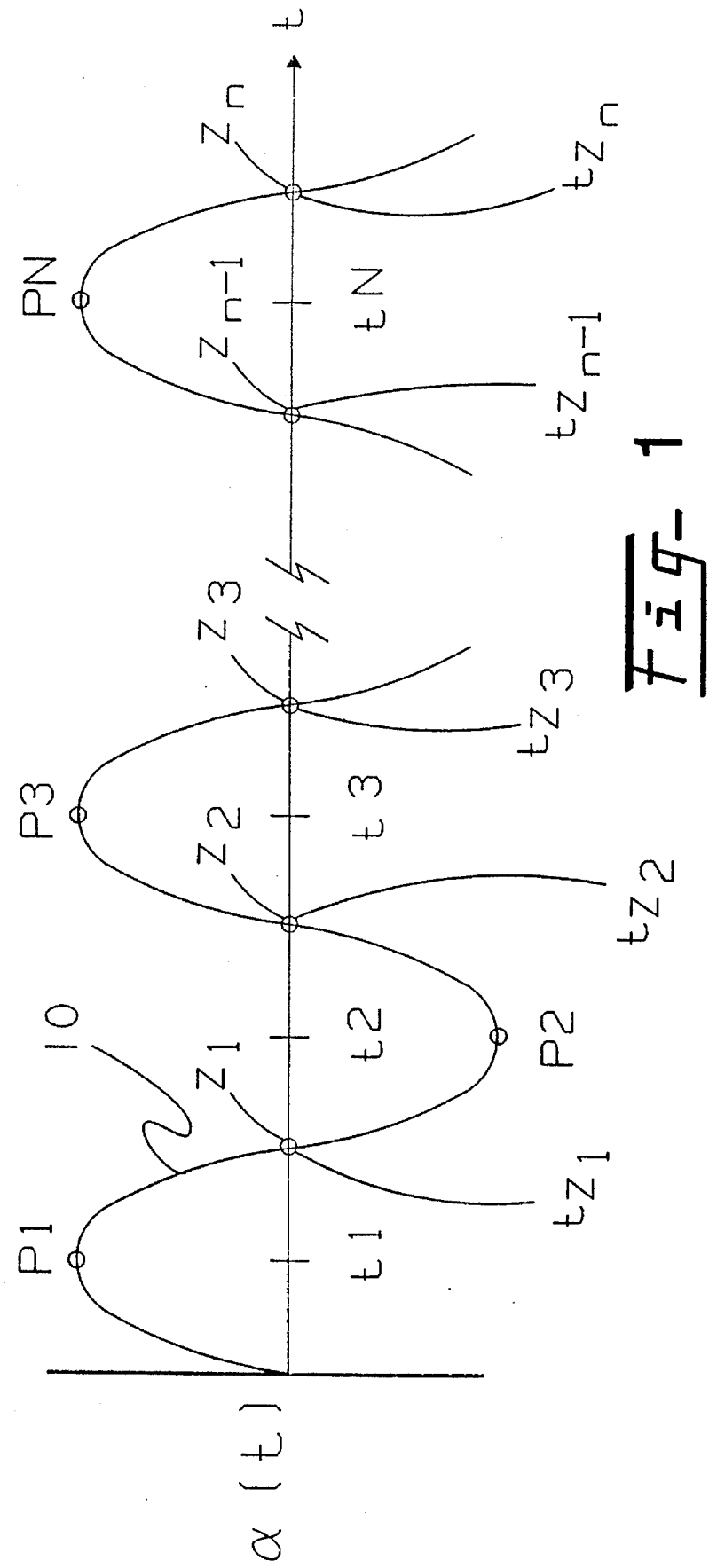
FIG. 1 shows a graphical representation of a sampling method for sampling a dither signal as used in one embodiment of the present invention.

Referring now to FIG. 1, a graphical representation of a sampling method for sampling a dither signal as used in one embodiment of the present invention is shown. A dither drive signal 10 is proportional to a dither angle $\alpha$. The dither drive signal 10 may be typically generated by a piezo-electric element mounted to a dither motor attached to a ring laser gyro. Such mechanisms are well known in the art as discussed hereinabove. In accordance with the present invention, peak amplitudes $P_1, P_2, P_3 \ldots P_n$ may be sensed at corresponding times $t_1, t_2, t_3 \ldots t_n$. In addition to reading the peak amplitudes, the ring laser gyro output angle may be simultaneously sensed at each of the same corresponding times $t_1, t_2, t_3 \ldots t_n$.

In addition to peak detection, the method of the invention provides a means for sensing zero crossings at $Z_1, Z_2, Z_3 \ldots Z_n$. These measurements are made at times $T_{Z1}, T_{Z2}, T_{Z3} \ldots T_{Zn}$. The dither angle signal zero crossings are used in the method of the invention to determine phase angle errors as discussed further below.

Using the method and apparatus of the invention, as explained in more detail hereinbelow, the value of the change in stripped gyro angle, which may also be called the gyro net output, $\Delta\phi$, is calculated as $\Delta\phi=(\phi_n-\phi_{n-1})-(\alpha_n-\alpha_{n-1})K$, where K is a gain correction factor which operates on the dither signal in stripping the dither signal component from the unstripped gyro angle to yield a stripped gyro angle output. As used in the aforesaid expression, $\phi_n$ represents an unstripped gyro angle sampled at time $t_n$. K is herein also referred to as DSGAIN in one example embodiment of the invention. These values of $\Delta\phi$ with the sign of $\alpha_n$ are then summed into an integrator to correct the value of K. Using the method of the invention, the value of $\Delta\phi$ is substantially a maximum sensitivity because $\alpha_n$ and $\alpha_{n-1}$ are typically widely spaced apart due to their correspondence in time to the selected peak amplitudes.

Figure 2:
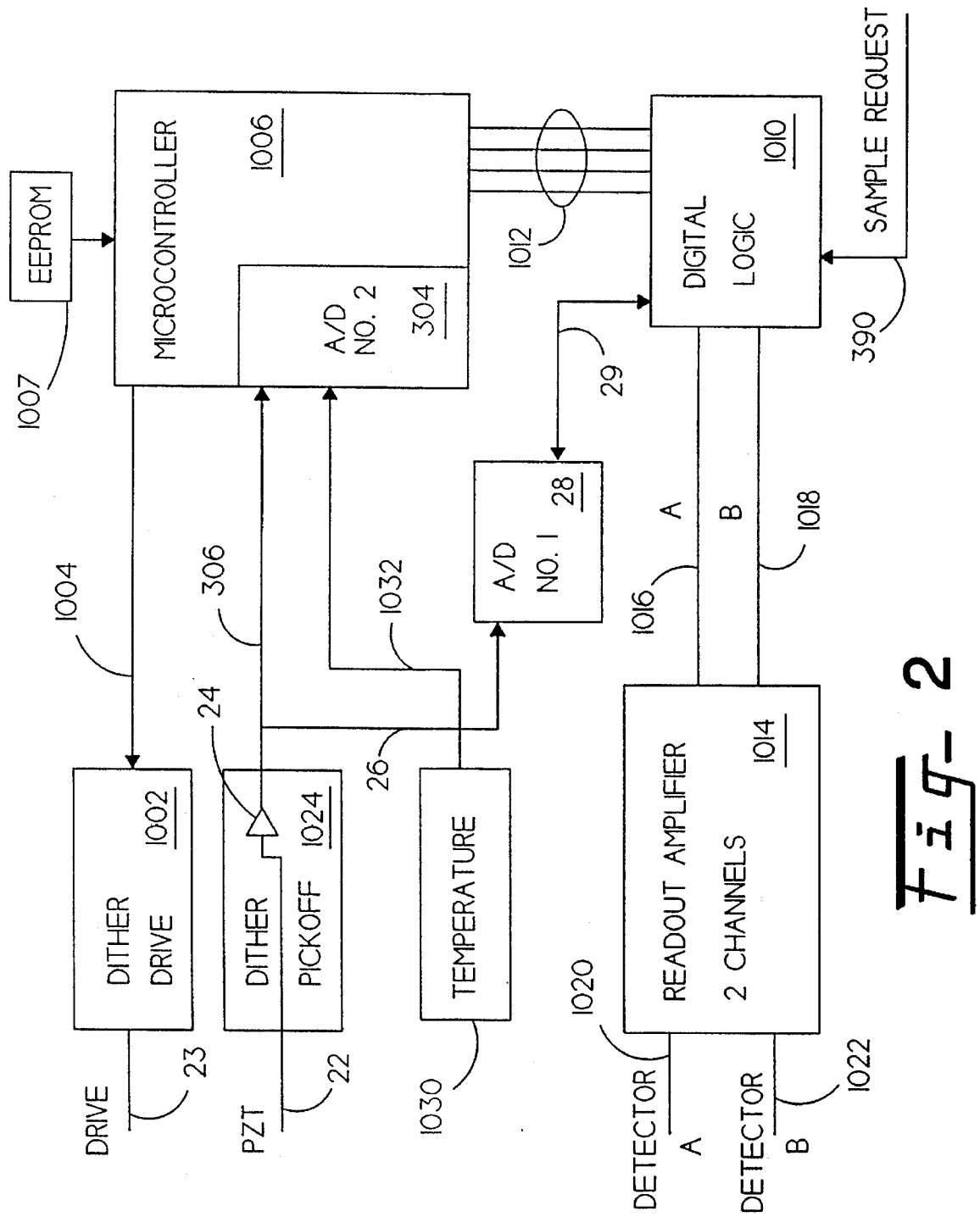
FIG. 2 shows a block diagram of a microcontroller based apparatus for implementing the dither stripper method of the present invention.

Referring now to FIG. 2, there shown is a block diagram of a microcontroller apparatus for implementing the dither stripper method of the present invention. The apparatus comprises a microcontroller 1006, digital logic 1010, a first analog-to-digital (A/D) converter 28, a read out amplifier 1014, a temperature sensing apparatus 1030, a dither pick-off apparatus 1024, and a dither drive 1002. The microcontroller 1006 may comprise any of a number of conventional microcontrollers such as the Intel 80C196KC microcontroller manufactured by Intel Corporation, USA. The microcontroller 1006 advantageously has an on board analogue to digital converter 304.

The dither drive 1002 receives a dither drive signal 1004 to drive a dither motor on the ring laser gyro (not shown) in a conventional manner through drive line 23. A dither pickoff signal 22 is received from the drive elements, in this example received from piezo-electrical elements (PZTs). The use of PZT elements on ring laser gyro dither motors is well known. The dither pick-off signal 22 is amplified through an amplifier 24 in the dither pick-off apparatus 1024 and the dither pick-off signal is then provided by the dither pick-off apparatus on lines 306 and line 26. Line 306 is connected to a first input of the second A/D converter 304. Line 26 is connected to an input of the first A/D converter 28. The temperature sensor 1030 outputs a temperature signal on line 1032 which is also received at a second input of the second A/D converter.

Read out counts from the ring laser gyro are received from detector A on line 1020 and detector B on line 1022. The read out amplifier provides A and B channels 1016, 1018 respectively with an amplified count signal on each line to the digital logic 1010. Digital logic 1010 is also coupled at an interface bus 29 to the first A/D converter 28 in order to receive digitized dither pick-off signals. The digital logic is also coupled by means of bus 1012 to the microcontroller for purposes of transmitting data and addresses in a conventional manner. A sample request line 390 handles external system sample requests for gyro output data. The sample request line 390 operates as an interrupt to provide the requested data.

Figure 3:
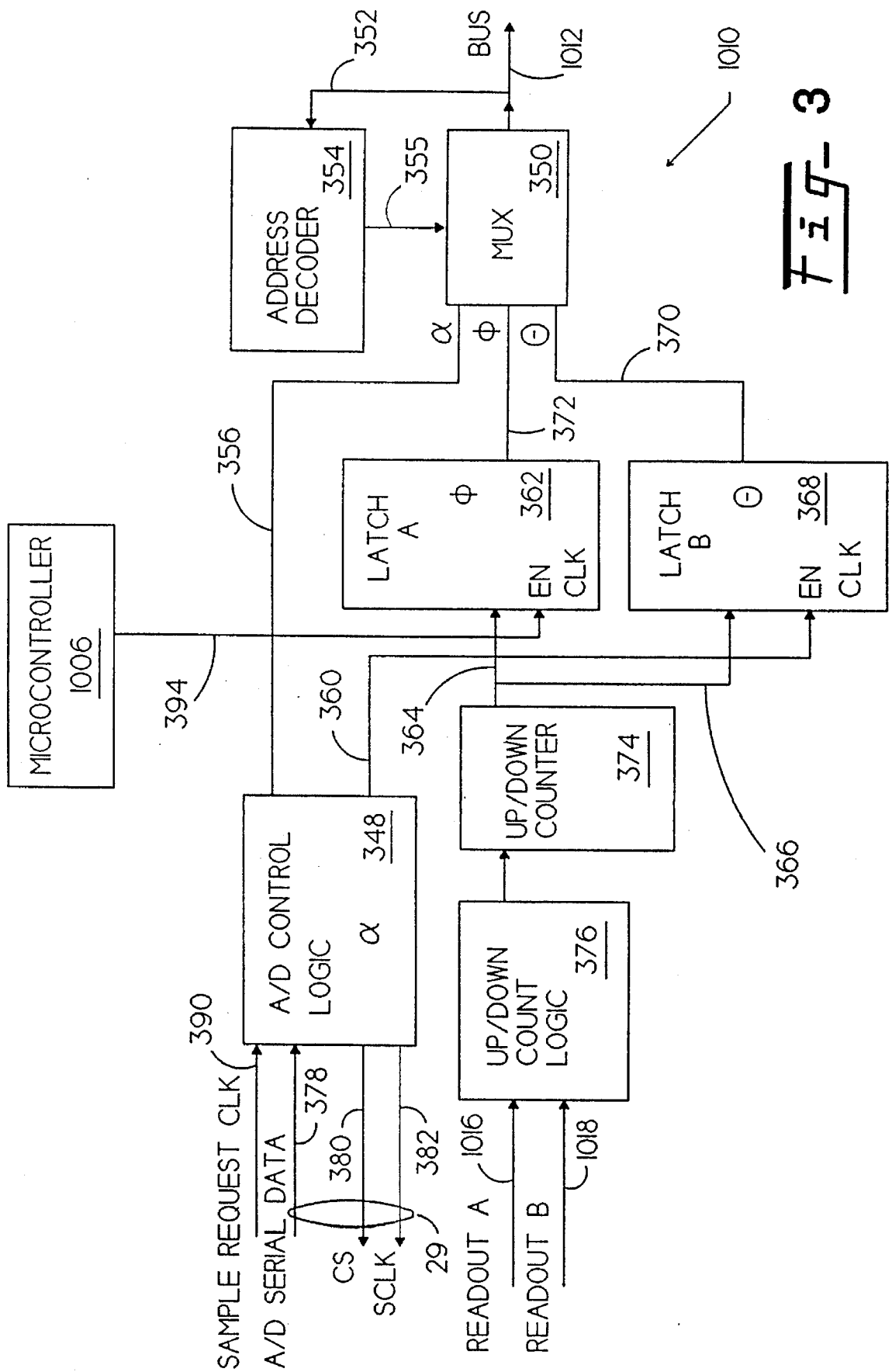
FIG. 3 shows a schematic block diagram of a microcontroller based apparatus for dither stripping an RLG digital logic apparatus.

In one example embodiment the digital logic 1010 comprises an integrated circuit manufactured by "ACTEL, model number A1225". A more detailed description of the digital logic 1010 is shown in FIG. 3. Those skilled in the art will recognize that other components may be added to the microcontroller shown herein for the purposes of adding more features to a modular ring laser gyro system.

Now referring to FIG. 3, a more detailed block diagram of the digital logic 1010 is shown. The digital logic 1010 comprises A/D control logic 348, a first latch 362, a second latch 368, a multiplexer 350 and address decoder 354, an up/down count logic 376 and up/down counter 374. Line 29 from the first A/D converter 28 further comprises an A/D serial data line 378, a chip select line 380 and a system clock line 382. The A/D control logic 348 also receives the sample request line 390 as generated by an external request for data. A/D control logic 348 receives dither pick-off information on A/D serial data line 378. The A/D control logic 348 then processes the A/D serial data 378 to provide a value for the dither angle α on line 356 to the multiplexer 350.

Up/down count logic 376 receives readout A from the ring laser gyro on channel 1016 and readout B from the ring laser gyro on channel 1018. Up/down count logic 376 processes the read out information in a well known manner and passes it to the up/down counter 374. Data from up/down counter 374 is provided to latch 362 and latch 368. The first latch 362 is enabled via control line 394 from the microcontroller 1006 at each peak and zero crossing of the dither signal as shown in FIG. 1. The second latch 368 is enabled by an enable signal on control line 360 in response to an external request impressed on sample request line 390. When the second latch 368 is enabled it latches the counter output 366 as ring laser gyro count angle θ which is transmitted on line 370 to the multiplexer 350. Depending upon the address provided by the microcontroller to address decoder 354 on line 352, the address decoder switches multiplexer 350 by means of a control signal on line 355 to switch either the dither angle α, gyro angle φ or gyro angle θ through the multiplexer 350 onto the bus 1012.

It is helpful to note that, for the purposes of understanding FIG. 3, the ring laser gyro count angles φ and θ may comprise the same value. That is, they both comprise unstripped gyro angle counts. However, the angle φ is latched only at times substantially simultaneous with peaks and zero crossings of the dither pickoff signal as discussed above with reference to FIG. 1. In contrast, the angle θ is equivalent to gyro count data taken at the time an external system request is processed. An external system request may occur at any time. Further, the angle θ may be provided to the external system as a corrected angle by applying the previous correction factors in a manner similar to that discussed herein for internal use for deriving a stripped gyro angle output.

Figure 4:
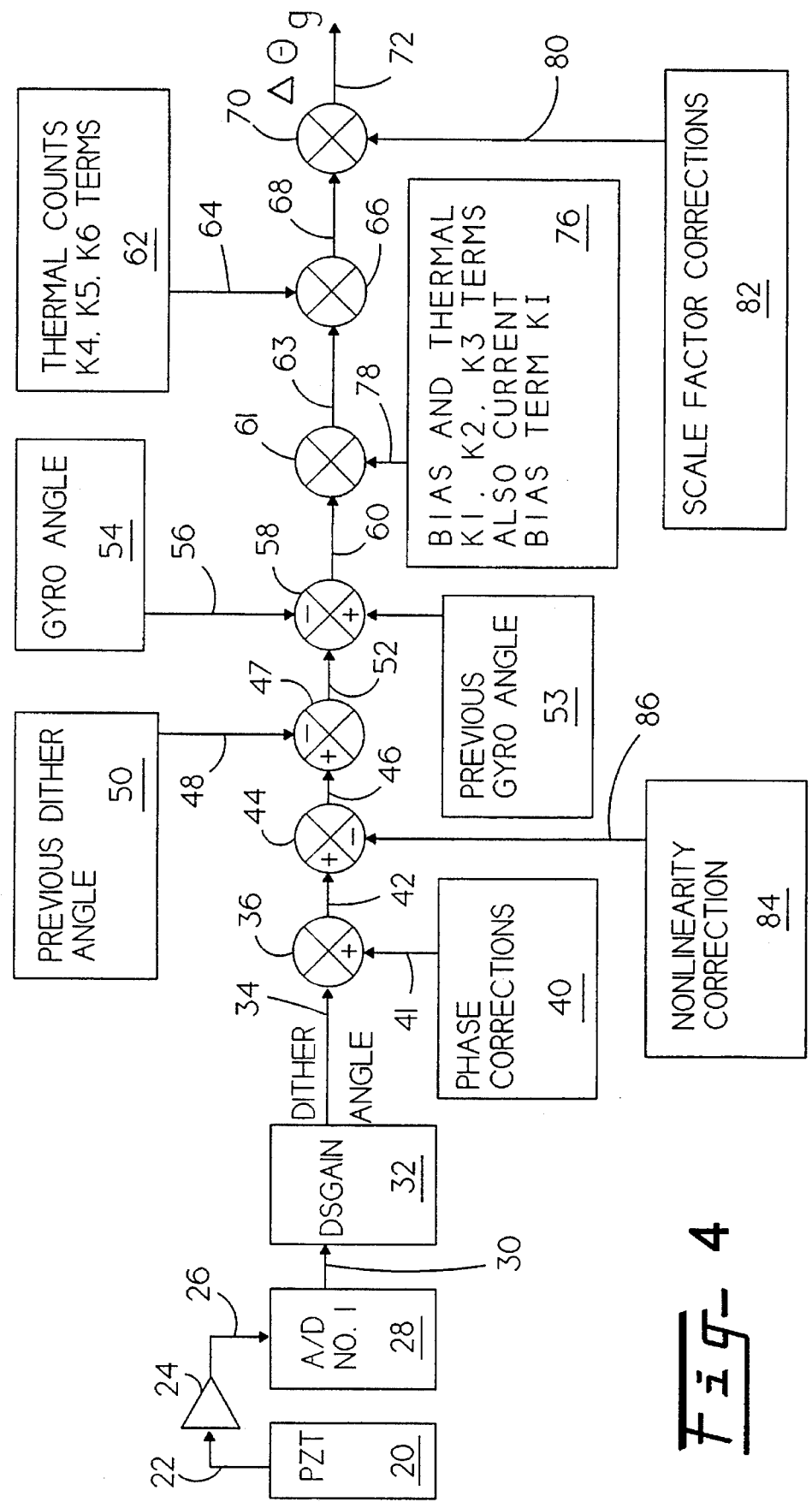
FIG. 4 shows a functional diagram of a method and apparatus for calculation of a change in stripped gyro angle $\Delta\theta_g$ as employed in one example of the present invention.

Now referring to FIG. 4, a schematic block diagram of a method and apparatus for calculation of a change in stripped gyro output angle $\Delta\theta_g$ is implied in one example of the present invention as shown. The piezo-electric (PZT) or other dither drive element 20 provides a dither signal 22 to an amplifier 24 which outputs an amplified dither signal on line 26 into first A/D converter 28. The first A/D converter 28 converts the analog signal received on line 26 into a digital data signal on line 30 which is provided to a gain element 32 labeled DSGAIN. The output of DSGAIN gain element 32 on line 34 is a dither angle α. The dither angle α on line 34 is summed at a first summing junction 36 with phase corrections from phase correction apparatus 40 which are provided on line 41. The output of the first summing junction 36 on line 42 is provided to a second summing junction 44 where it is subtracted from a nonlinearity correction factor as provided by nonlinearity correction apparatus 84 on line 86. The second summing junction 44 then provides a corrected signal on line 46 to a third summing junction 47 where it is subtracted from the previous dither angle provided in a conventional way by storage device 50. The difference is then output on line 52 to a fourth summing junction 58 where it is summed to the previous gyro angle stored in memory element 53 and subtracted from the current gyro angle which may be stored in memory device 54. The output of the fourth summing junction is transmitted on line 60 to a fifth summing junction 61 where it is added to bias and thermal bias terms $K_1$, $K_2$, and $K_3$ along with a current bias term $K_I$ from block 76. Use of the current bias term $K_I$ is optional. $K_I$ may be determined from factory calibration measurements. The output is provided on line 63 to a sixth summing junction 66 where it is added to thermal count $K_4$, $K_5$, and $K_6$. The output of the sixth summing junction 66 is added at a seventh summing junction 70 with a scale factor correction provided by block 82 on line 80 to provide the final stripped gyro angle $\Delta\theta_g$ in this example.

In one example of the method of the invention, PZT 20 is read at each system request in less than one microsecond and is within 0.16 microseconds of the gyro count reading. The PZT voltage value is corrected for the gain of the amplifier and the PZT; corrected for the pick-off amplitude nonlinearity; corrected for the phase difference between the pick-off and the gyro; and subtracted from the previous corrected pick-off angle. This value is then subtracted from the difference in the previous unstripped gyro angle and the present unstripped gyro angle. This produces the change in stripped gyro angle. This value is then further corrected by the gyro bias and count calibrations as a function of temperature. At this time the gyro scale factor is also corrected. These corrections take place at various times to preserve an accuracy in a modular ring laser gyro system of about <0.001 deg/hour and less than 1 count.

In an alternate embodiment of the invention, the dither stripping and related calculations described throughout this specification may be accomplished with reference to the stripped or unstripped gyro angle itself without using the change in stripped gyro angle. This alternate approach eliminates the need for subtracting previous dither angle and previous gyro angle values since all angles are accumulated to provide a count representing the gyro angle output. The stripped gyro angle may also be expressed as the sum of all of the changes in stripped gyro angles.

The corrections and adjustments to the gyro and dither counts may be done at a resolution of at least 1.0 counts, but may be much smaller, that is, resolutions as low as 0.1 counts may be used. Those skilled in the art will also recognize that the terms may be summed in any order.

The output 22 of PZT 20 is read by the A/D converters. The second A/D converter is under microcontroller control and is read to control the dither amplitude; to measure the dither stripper gain; to measure the mean value of the PZT amplifier output; and to find the phase angle error. The PZT amplifier voltage is also read by the first A/D 28 upon command from an external system request. Compensation of the PZT measurement is made by multiplying the PZT voltage by the DSGAIN value measured in the DSGAIN loop and corrected for phase and nonlinearity.

The nonlinearity correction is a constant. It is stored in a memory device, as, for example an EEPROM 107. The value is used in one example embodiment of the invention approximately $$CORR=((ALPHA-ZERO)+8)^2+5000$$

Where:

CORR is the correction,

ALPHA is the present measured dither pickoff angle, and

ZERO is the calculated (i.e. the assumed mid-value) of the dither angle or the zero point.

The value of 5000 is only an example and may vary as, for example, with temperature. The correction is for positive nonlinearity, i.e. if the measured angle is too large requiring this correction to be subtracted from the measured value thus reducing the measured value. Those skilled in the art will recognize that other nonlinearity equations may be used such as substituting a cubic equation for the quadratic.

The phase error correction apparatus 40 between the pickoff voltage and the gyro angle may be derived by a measurement of a phase error angle at the gyro dither angle position. The phase error at other angles corresponding to external system request times may advantageously be found through a look up table which comprises values for a predetermined error correction function, as, for example, a cosine or sine function, expressed as a percentage of the peak dither angle.

Figure 6:
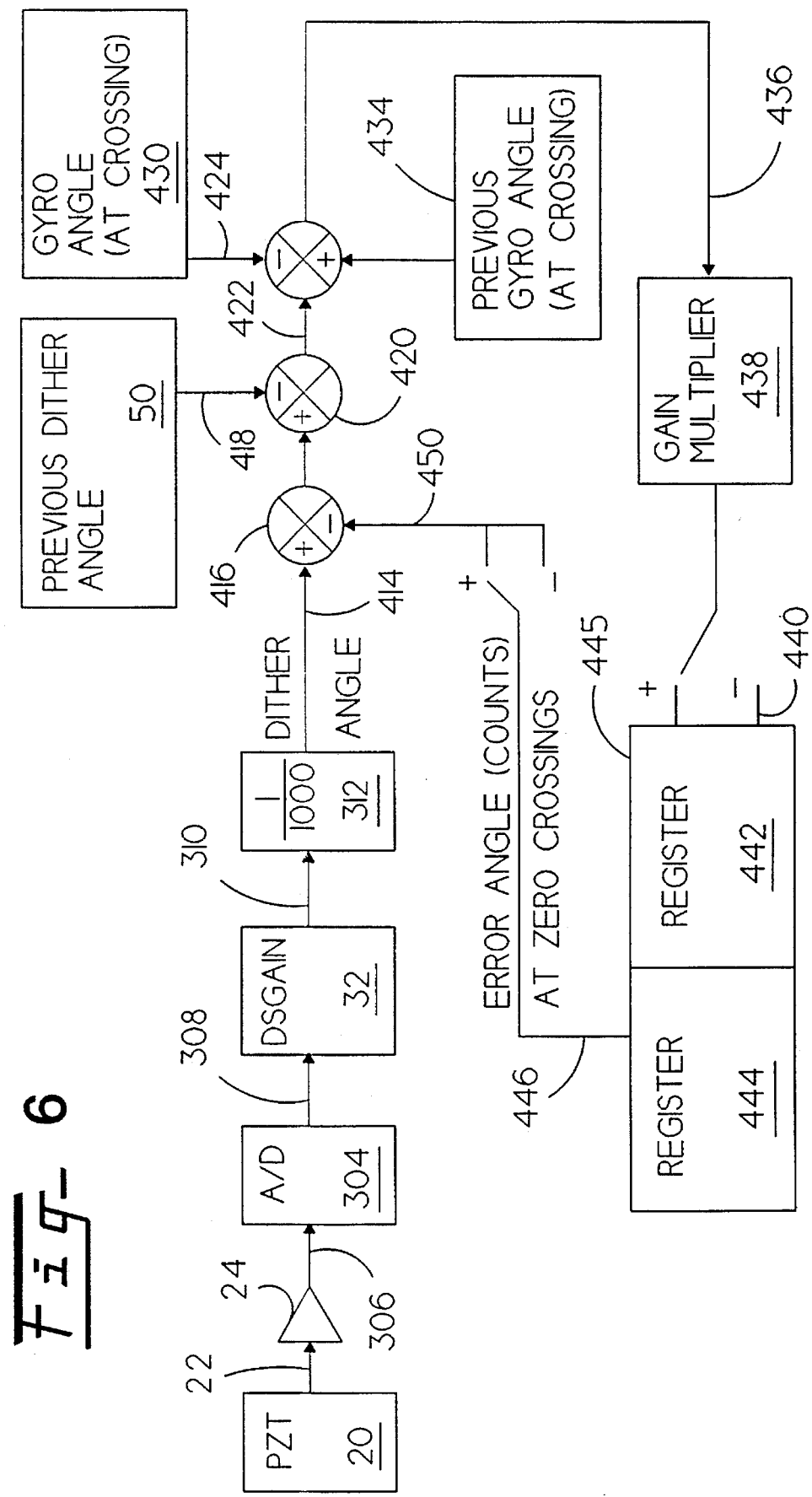
FIG. 6 shows a functional diagram of one example of a method and apparatus for measuring a phase error angle as employed in the present invention.

In one example, the phase loop as shown in FIG. 6 determines the phase error counts at both positive going and negative going zero crossings. The resultant value is called MAXPHASE and it is a signed value. When a system sample request is made, it may typically occur at an arbitrary phase angle on the dither cycle. By measuring the dither angle at the phase angle which coincides with the request and comparing the measured dither angle to the maximum command dither angle, ALPHAMAX, the sine of the phase angle on the dither cycle may be determined. The phase correction may then be determined as the cosine of the dither cycle phase angle multiplied by MAXPHASE. A simple look up table which references a cosine value for corresponding sine values may be employed to look up the phase correction.

At summing junction 47, the previous dither angle is subtracted from the present value, thus yielding the angle change. It should be noted in considering this process that an RLG is an integrating rate gyro with the output representing the integral of the dot product of the input rate and the gyro input axis. This subtraction also serves to assure that this process cannot introduce an error into the gyro output. This change in input angle $\Delta\phi$ is the basic measurement of the RLG done at summing junction 58.

Bias constants are determined as discussed below. Once per second, the bias correction is made by reading the stored coefficients of $K_1$, $K_2$, $K_3$ and calculating the count error DELTA as:

$$DELTA=K_1+K_2 \times TMP+K_3 \times TMP^2+DELTAR$$

Where:

TMP is the filtered value of temperature

DELTA is the count correction

DELTAR is the residual value of DELTA (over 1 count to an accuracy of 0.001 counts).

In one example, the value of this correction may be added to the output angle in increments of 0.1 counts and any residual angle of 0.001 counts retained as DELTAR. This preserves the accuracy of about <0.001 deg/hour to the gyro.

Once per second the value of the present filtered temperature, TMP, is compared to the previous temperature called TMPP. In one example, if the difference has an absolute value greater than 0.2° F., corresponding to a correction greater than 0.1 arc second, then the following correction is calculated and used to correct the gyro output:

$$DELTA=(TMP-TMPP)\times(K_4+(TMP+TMPP)/2\times K_5)+DELTART$$
$$TMPP=TMP$$

The value of this correction may be added to the output angle in increments of 0.1 counts and any residual angle of 0.001 counts retrained as DELTART. This preserves the accuracy of 0.001 deg/hour. Note that each count is 1.1123 arc seconds and that 1 count/second is 1.112 deg/hour. The maximum value of these terms, for one embodiment of a modular laser gyro is about 2 arc seconds per 2° F. Therefore, at thermal rates of even 300° F. per hour, this term is not greater that 0.12 counts per second.

The correction of scale factor 82 may be corrected to an accuracy of one part per million. The total output angle may be monitored and a correction of counts be performed whenever the total equals or exceeds a pre-stored signed value. This correction may be accomplished at each output request when the output DELTAR is greater than a predetermined number of counts; for example, 1,000 counts. Residuals must be retained to preserve the scale factor accuracy of 1 ppm. This value will change about 4 ppm as the mode changes.

Figure 5:
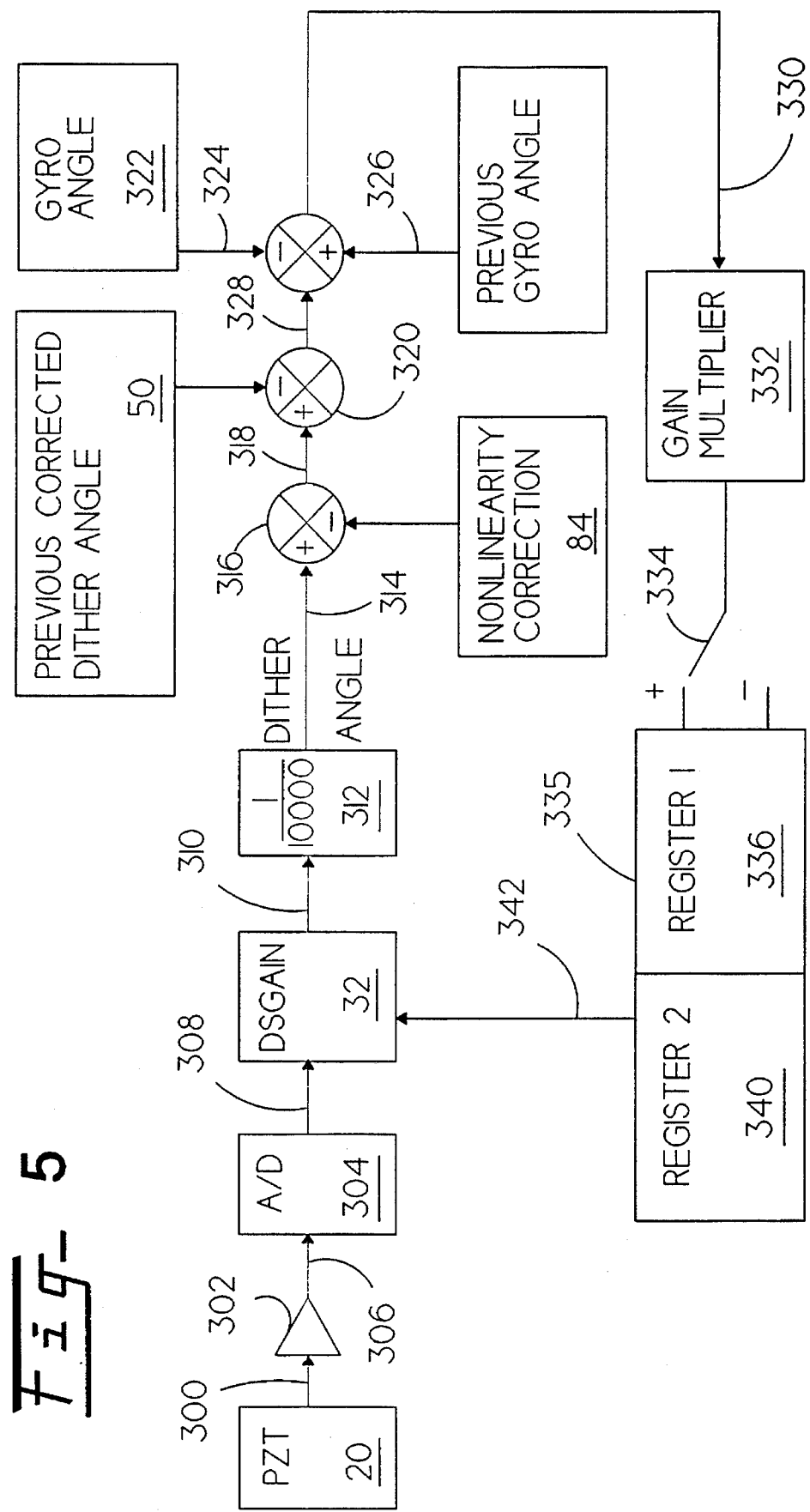
FIG. 5 shows a functional diagram of a method and apparatus for calculation of dither stripper gain as employed in one example of the present invention.

Referring now to FIG. 5, a functional diagram of a method and apparatus for calculation of dither stripper gain as employed in one example of the present invention is shown. The dither stripper gain, DSGAIN, is calculated by a function based upon the dither drive values at each peak. The DSGAIN may be used to correct the PZT measured voltage to be a substantially exact measure of the dither angle as expressed in counts. The DSGAIN has the dimensions of gyro counts/volt. The gain has a time constant of 0.2 seconds for the first 3 seconds after starting the RLG system and 12 seconds thereafter.

The calculation for dither stripper gain may be processed as follows. At each dither peak, such as when the dither output is measured for the dither drive loop. PZT 20 outputs a signal on line 22 which is amplified by amplifier 24. The amplified PZT signal is output onto line 306 and received by A/D converter 304 which supplies a digital signal representative of the PZT output on line 308. The unstripped gyro angle is then used, together with the previous value of the unstripped gyro angle and a correction for nonlinearity 84 from stored parameters, to find a value for the gain correction factor DSGAIN. The value of the PZT output on line 308 is multiplied by the gain element 32 labeled DSGAIN. The resultant output from the gain element 32 is output as a gain corrected dither angle on line 310 and received by a scaling element 312. The scaling element 312 operates to scale the dither angle. In one example of the invention, the scaling element 312 operates to divide the gain corrected dither angle on line 310 by a factor of 10000. After scaling, a nonlinearity correction 84 is then added to the scaled dither angle at summing junction 316. Summing junction 316 outputs the nonlinearity corrected dither signal on line 318 which is received by a second summing junction 320. Note that the nonlinearity correction does not have to be recalculated each time because the nonlinearity correction is always the same at the peak dither angle which is equal to the command angle. This value for the nonlinearity correction may be read from stored parameters.

The output of the second summing junction is a difference value which is sent on line 328 to a third summing junction 329. A block 331 stores the previous unstripped gyro angle and a block 322 stores the current unstripped gyro angle. The current unstripped gyro angle is impressed on line 324 and subtracted from the difference value on line 328 while the previous gyro angle is impressed on line 326 and summed at the third summing junction to the difference value on line 328. The resulting value is impressed on line 330 and gain multiplier 332 operates on the result. In one example, gain multiplier 332 multiplies the result from line 330 by a gain of 600 for the first second after start of the RLG and by 10 thereafter to produce a gain correction value. In this way, the multiplier 332 operates to adjust the time constant in the gain correction loop. The gain correction value is then accumulated in a 32 bit register 335. Register 335 is comprised of low 16 bit register 336 and high 16 bit register 340. The most significant bits, register 340, are used to correct the DSGAIN factor. In this way the gain factor, DSGAIN, applied to the dither angle is continuously updated.

Referring now to FIG. 6 a functional diagram of one example of a method and apparatus for measuring a phase error angle as employed in the present invention is shown. As can be seen the apparatus of FIG. 6 includes PZT 20, amplifier 24, A/D 304, gain element 32 and scaling element 312 as discussed herein with reference to FIG. 5. The aforesaid elements operate in a substantially similar manner as discussed above. A scaled dither angle is transmitted on line 414 to a first summing junction which outputs a difference value to a second summing junction 420 which also receives a value representing the previous dither angle from storage device 50. The second summing junction provides a second difference on line 422 to a third summing junction 425. The third summing junction 425 also receives a value representing the unstripped gyro angle at the zero crossing from block 430 and the previous unstripped gyro angle at the zero crossing from block 434. The unstripped gyro angle at the zero crossing is subtracted and the previous unstripped gyro angle at the zero crossing is added to the second difference value to yield a corrected angle on line 436. The corrected angle is then multiplied by a factor from a phase angle gain multiplier element 438 to produce an error angle count at zero crossings on line 440. Depending upon the sign of the rate of change of the dither angle at zero crossings on line 440, the output is switched as a positive or negative value into a register 445. Register 442 holds the low 16 bits and register 444 holds the high 16 bits of 32 bit register 445. The sign of the switch 451 follows the sign of the zero crossing dither angle as explained hereinbelow.

The phase correction is made from the phase error measured by the phase error loop of FIG. 6. At the zero crossings of the dither pickoff angle, at both zero and 180 degrees, the output stripped angle is measured and is added to a 32 bit accumulator with a sign set at plus for the zero crossing and negative for the 180° crossing. The output of this accumulator is added to the PZT count output also with the sign of the crossing. This loop finds the value of counts which satisfy the loop, and is the measure of the phase error angle. This value is used in the dither stripper to correct a gyro angle output in response to a system request.

The compensation of the laser gyro output is accomplished by compensation for three sets of nominal constants. The constants include:

1) The set of coefficients describing the bias of the gyro as a function of temperature;
2) The set of coefficients describing the angle changes as a function of temperature. These coefficients are usually described as angular degrees/hour per °F./hour but this is identical to angular degrees/°F.; and
3) The scale factor correction to correct the gyro output to the value of 1,165,120 counts per revolution corresponds to 1.112332 arc seconds per count. Any particular gyro may require a change in scale pitch by 0.2% corresponding to ±2,330 counts. The scale factor must be corrected to <±5 counts/hour to achieve a 5 ppm precision.

Bias corrections.

The coefficients of the bias vs. temperature are determined for each unit during testing and expressed as shown in Table I below.

TABLE I

| Coefficient | Dimensions | Typical Value | Value at 200 F. |
|---|---|---|---|
| $K_1$ | deg/hour | 0.128 | 0.128 |
| $K_2$ | deg/hour/°F. | 0.000246 | 0.049 |
| $K_3$ | deg/hour/°F.$^2$ | 0.00000089 | 0.036 |

For operation in the microcontroller of one embodiment of the invention, the coefficients $K_1$, $K_2$, and $K_3$ may each be handled as a 16 bit number and all calculations may be performed to preserve an accuracy of at least $2 \times 10^{-4}$ deg/hour.

K' coefficients have values which are corrected for a scale factor (SF) and in one embodiment of the invention may be as shown in Table II below:

TABLE II

| Coefficient | Calculation | Maximum Value E 200 °F. | Minimum Value of Correction @ 200 °F. (½ of LSB) | Q Value Per Least Sig. Bit | Typical Value |
|---|---|---|---|---|---|
| $K_1'$ | $K_1 \times 2^{13}/SF$ | 4.0 deg/hour | $0.60 \times 10^{-4}$/hour | $0.60 \times 10^{-4}$/hour | 943 |
| $K_2'$ | $K_2 \times 2^{21}/SF$ | 3.2 deg/hour | $0.48 \times 10^{-4}$/hour | | 464 |
| $K_3'$ | $K_3 \times 2^{29}/SF$ | 2.4 deg/hour | $0.38 \times 10^{-4}$/hour | | 430 |

These coefficients are then used to correct the gyro output as in the following equations.

$$\Delta\theta = 2^3[K_1' + K_2'T/2^8 + K_3'T^2/2^{16}]$$

$$\theta c = \theta c + \Delta\theta \text{ (32 bit number)}$$

$$\theta c(\text{out}) = \theta c \text{ (upper 16 bits)}$$

$$\theta c = \theta c - \theta c(\text{out}) \times 65{,}536$$

Example Using The Typical Values Above:

$$\Delta\theta = 2^3[819 + 262 \times 100/2^8 = 268 \times 10{,}000/2^{16}]$$

$$\Delta\theta = 7{,}696$$

$\Delta\theta = 65{,}536$ every 8.5 seconds or an overflow of 0.117 Counts per sec correction These steps may advantageously be processed in background software programs since they do not depend on current gyro data with the exception of temperature which is filtered through a one second filter. The calculation may advantageously be done once per second so that in one hour this calculation may be performed 3600 times.

Temperature Angle Correction

Coefficients for correcting angle error as a function of temperature may be determined from gyro thermal tests for each gyro. Typical coefficients are expressed as shown below in Table III.

TABLE III

| Coefficient | Dimension | Typical Value | Value at 200 F. and 360° F./hour rate |
|---|---|---|---|
| $K_4$ | deg/°F. | $-0.35 \times 10^{-3}$ | $-0.126$ deg/hour |
| $K_5$ | deg/°F./°F. | $0.17 \times 10^{-5}$ | $0.122$ deg/hour |

For the operation of the microcontroller, the $K_4$ and $K_5$ coefficients may each be handled as a 16 bit number and all calculations may be performed to an accuracy of at least $2 \times 10^{-4}$ deg/hour when exposed to an input thermal rate of 360° F./hour and at 200° F. The data stored in the microcontroller may advantageously be stored for 16 bit calculations to preserve accuracy. The values of K' coefficients which are corrected for a scale factor (SF) are as shown below in Table IV.

TABLE IV

| Coefficient | Calculations | Maximum Value @ 200° F. and 360°F. | Minimum Value Per Hour | Typical Value $K_4$' & $K_5$' |
|---|---|---|---|---|
| $K_4$' | $K_4 \times (3600) \times 2^{10}/SF$ | 3.2 deg/hour | $0.48 \times 10^{-4}$ deg/hour | $-1160$ |
| $K_5$' | $K_5 \times (3600) \times 2^{18}/SF$ | 2.5 deg/hour | $0.38 \times 10^{-4}$ deg/hour | $+1442$ |

The $K_4$' & $K_5$' coefficients may then be used to correct the gyro output θ as shown in the following equation:

$$\Delta\theta = 2^6[K_4' + (K_5' \times (T_N + T_{(N-1)}))/2^9] \times [T_N - T_{(N-1)}]$$

$$\Delta\theta = 64[K_4' + (K_5' \times (T_N + T_{(N-1)})/512] \times [T_N - T_{(N-1)}]$$

$$\theta c = \theta c + \Delta\theta$$

$$\theta c(\text{out}) = \theta c(\text{upper 16 bits})$$

$$\theta c = \theta c - \theta c(\text{out})$$

where $T_N$ and $T_{(N-1)}$ are the successive gyro temperatures measured at one to ten second intervals.

Example For $K_4$' & $K_5$' Calculation Using The Typical Values At 100° F. and 720° F. Per Hour Thermal Rate $$\Delta\theta = 2^6[-1160 + 1442 \times 100/2^8] \times [0.02]$$

$$\Delta\theta = -764 \text{ counts per second (assuming the temperature rate is 0.02° per second). This equates to a count of one every 86 seconds or 0.012° per hour at 100° F. NOte that at 0° F., the correction is 0.023° per hour.}$$

These steps may advantageously be done in background processing since they do not depend upon current gyro data with the exception of temperature which is filtered through a one second filter. Note it is not important that this be exactly one second. Two seconds may work equally well.

The net output will be the two coefficients multiplied by the total temperature change.

In one example of the invention, a difference in temperature of 0.1° F. produces an angle correction of about 0.05 counts. Therefore, this term, even at thermal rates of 360° F./hour, produces a correction of only 0.05 counts per second. A measurement of once per 10 seconds will keep the corrections to less than 1 count even in the presence of very high thermal rates of up to 700° F./hour. A measurement of once per second permits high resolution calculations at up to 7,000° F. per hour.

Scale Factor Correction

The scale factor correction may be accomplished to an accuracy of about one ppm by using a number N to make corrections. This value, N, is equal to the number of counts which are counted before making a correction of one count. "N" is calculated at calibration time by dividing a measured scale factor, SF, by the error counts as in the following equation:

$$N = SF/(SF - SF_O)$$

where:

SF is the measured scale factor counts per revolution, and
$SF_O$ is a nominal trimmed scale factor counts per revolution.

The value of N is used in the microprocessor to correct the scale factor by adding or subtracting a count, as appropriate, every time the output increases or decreases by N counts.

Example Using The Above Data Where N=582 For A Scale Factor Error Of −2000 Counts Per Revolution For an input angle of 10 revolutions the non-corrected gyro counts are 11,631,120. In that angle, the above correction will add 19,985 counts for a total of 11,651,105 counts which is the equivalent of 1.3 ppm error. This correction of about 0.2% is at the maximum range of performance by an RLG. The nominal scale factor is 1.11234 arc seconds per count. The peak correction error is:

Peak Error (ppm)=50 (correction{percent})$^2$.

For a correction of 0.1%, the peak error is 0.5 ppm. The RMS error is equal to the peak error divided by $3^{1/2}$. For the above example, the RMS error is 0.29 ppm. At the maximum correction of 0.2%, the RMS error is 1.15 ppm.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for determining a stripped change in gyro angle comprising the steps of:

(a) sensing a plurality of peak amplitudes $P_1, P_2, P_3 \ldots P_n$ from a dither drive signal wherein each of the plurality of peak amplitudes has corresponding times $t_1, t_2, t_3 \ldots t_n$;

(b) simultaneously sensing a plurality of ring laser gyro output angles at each of the corresponding times $t_1, t_2, t_3 \ldots t_n$; and (c) determining a stripped change in gyro angle, $\Delta\phi$, according to a relationship wherein $\Delta\phi=(\phi_n-\phi_{n-1})-(\alpha_n-\alpha_{n-1})K$, where K is a correction factor, $\phi_n$ is an unstripped gyro angle sampled at time $t_n$ and $t_{n-1}$, and $\alpha$ is a dither angle.

2. The method for determining a stripped change in gyro angle of claim 1 further comprising the step of summing values of $\Delta\phi$ with $\Delta\alpha_n$ into an integrator to correct the value of K where $\Delta\alpha_n$ is a change in dither angle.

3. The method for determining a stripped change in gyro angle of claim 2 wherein the step of summing values of $\Delta\phi$ with $\Delta\alpha_n$ into an integrator to correct the value of K further comprises the steps of:

(a) increasing the dither angle by the correction factor, K, to derive a corrected dither angle;

(b) taking the difference between a previous corrected dither angle and the corrected dither angle to derive a change in dither angle; and (c) taking the difference between a current gyro angle and the change in dither angle and combining a previous gyro angle to derive a change to the correction factor K.

4. The method for determining a stripped change in gyro angle of claim 3 further comprising the step of increasing the change in correction factor K by a second gain factor to obtain an updated correction factor change.

5. A dither signal stripper apparatus for a ring laser gyro, the ring laser gyro having a dither pickoff, wherein the dither pickoff has a dither pickoff output, the dither pickoff output includes a plurality of zero crossings and peaks, the dither signal stripper apparatus comprising:

(a) control means for deriving a stripped gyro angle signal having a control output which is activated at each of the plurality of zero crossings and peaks of the dither pickoff output;

(b) first analog to digital conversion means for converting the dither pickoff output to a first digital dither pickoff output, wherein the first analog to digital conversion means is coupled to the control output and is responsive to the control output so as to be activated at zero crossings and peaks of the dither pickoff output; and (c) second analog to digital conversion means for converting the dither pickoff output to a second digital dither pickoff output.

6. The dither signal stripper apparatus of claim 5, wherein the dither signal stripper apparatus further comprises up/down count logic means having a count output, the dither signal stripper apparatus further comprising:

(a) logic means for analog to digital control having an input connected to receive the first digital dither pickoff output, a sample request enable output and a dither angle output, wherein the sample request enable output is responsive to an external sample request;

(b) first latch means for storing a count having an enable input connected to the control output, wherein the first latch means has a first latch output, the count representing a laser gyro sensing angle;

(c) second latch means for storing the count having an enable input connected to the sample request enable output, wherein the second latch means has a second latch output; and (d) multiplexer means for providing an angle data signal on a data bus in response to a bus address request signal having a first multiplexer input connected to the dither angle output, a second multiplexer input connected to the first latch output, and a third multiplexer input connected to the second latch output.

7. An apparatus for generating a dither stripper gain factor for use in a ring laser gyro, the apparatus for generating comprising:

(a) a means for providing a dither signal on a dither signal output;

(b) means for amplifying connected at an input to the dither signal output, the amplifying means having an amplified output;

(c) means for analog-to-digital conversion having an input connected to receive the amplified output and having a digital output which supplies a digital signal representative of the amplified output;

(d) means for adding gain having a first input connected to the digital output and having a gain output, the gain adding means operating so as to multiply a value of the digital output by a gain factor, wherein the means for adding gain also has a gain factor input;

(e) means for scaling having an input connected to the gain output and having a dither angle output;

(f) means for providing a nonlinearity correction connected to the dither angle output having a nonlinearity corrected dither angle output;

(g) first means for subtracting a previous dither angle from the nonlinearity corrected dither angle output, the first means for subtracting including an input connected to receive the nonlinearity corrected dither angle output and having a first difference value output;

(h) second means for subtracting a current gyro angle and adding a previous gyro angle, the second subtracting means including an input connected to the first difference value output and having a second difference value output;

(i) a gain multiplier means for multiplying having an input connected to the second difference value output and having a switched output wherein the gain multiplier means multiplies the second difference value output to produce a gain correction factor at a gain correction factor output switch wherein a polarity of the gain correction factor is switched to follow the polarity of the dither angle output; and (j) means, connected to the gain correction factor output switch, for transferring the gain correction factor to the means for adding gain by connection to the gain factor input.

8. The apparatus for generating a dither stripper gain factor for use in a ring laser gyro of claim 7, wherein the transferring means further comprises a register means connected at a data input to the gain correction factor output switch, the register means including a data output connected to the gain factor input.

9. The apparatus for generating a dither stripper gain factor of claim 7 wherein the gain multiplier means multiplies by a first factor gain for a first time period after start of a ring laser gyro and by a second gain factor thereafter to produce a gain correction factor.

10. An apparatus for measuring a phase error angle for use in a ring laser gyro, the apparatus for measuring comprising:

(a) a means for providing a dither signal on a dither signal output;

(b) means for amplifying connected at an input to the dither signal output, the amplifying means having an amplified output;

(c) means for analog-to-digital conversion having an input connected to receive the amplified output and having a digital output which supplies a digital signal representative of the amplified output;

(d) means for adding gain having a first input connected to the digital output and having a gain output, the gain adding means operating so as to multiply a value of the digital output by a gain factor;

(e) means for scaling having an input connected to the gain output and having a dither angle output;

(f) means for providing an error angle correction connected to the dither angle output having an error angle corrected dither angle output and having an error angle correction input;

(g) means for subtracting a previous dither angle from the error angle corrected dither angle output, the means for subtracting including an input connected to receive the error angle corrected dither angle output and having a difference value output;

(h) means for subtracting a current gyro angle and adding a previous gyro angle, the subtracting and adding means including an input connected to the difference value output and having a summing output;

(i) a gain multiplier means for multiplying having an input connected to the summing output and having a switched output wherein the gain multiplier means multiplies the difference value to produce a phase error angle at an output switch wherein a polarity of the phase error angle is switched to follow a polarity of the dither angle output; and (j) means connected to the output switch for transferring the phase error angle to the means for providing an error angle correction.

11. The apparatus for measuring a phase error angle of claim 10, wherein the transferring means further comprises:

(a) register means having a data input connected to the output switch, the first register means also having a data output; and (b) a polarized switch having an input connected to receive the data output and having an output connected to the error angle correction input wherein the polarized switch switches a polarity sign of the phase error angle correction to following the dither signal output.

12. A method for determining a stripped gyro angle comprising the steps of:

(a) sensing a plurality of peak amplitudes $P_1, P_2, P_3 \ldots P_n$ from a dither drive signal wherein each of the plurality of peak amplitudes has corresponding times $t_1, t_2, t_3 \ldots t_n$;

(b) simultaneously sensing a plurality of ring laser gyro output angles at each of the corresponding times $t_1, t_2, t_3 \ldots t_n$; and (c) determining a stripped gyro angle, $\phi_g$, according to a relationship wherein $\phi_g = \phi_n - \alpha_n K$, where K is a correction factor, $\phi_n$ is an unstripped gyro angle sampled at time $t_n$ and $\alpha_n$ is a dither angle at time $t_n$.

13. The method for determining a gyro angle of claim 12 wherein the step of determining a stripped gyro angle, $\phi_g$ further comprises the step of increasing the dither angle by the correction factor, K, to derive a change in the correction factor K.

14. The method for determining a stripped change in gyro angle of claim 13 further comprising the step of increasing the change in the correction factor K by a second gain factor to obtain an updated correction factor change.

15. The dither signal stripper apparatus of claim 5, wherein the control means comprises a microprocessor.

16. The dither signal stripper apparatus of claim 5, wherein the first analog to digital conversion means is embedded in the microprocessor.

17. A method for determining a stripped gyro angle comprising the steps of:

(a) sensing a plurality of peak amplitudes $P_1, P_2, P_3 \ldots P_n$ from a dither drive signal wherein each of the plurality of peak amplitudes has corresponding times $t_1, t_2, t_3 \ldots t_n$;

(b) simultaneously sensing a plurality of ring laser gyro output angles at each of the corresponding times $t_1, t_2, t_3 \ldots t_n$; and (c) determining a stripped gyro angle, $\phi$, according to a relationship wherein $\phi = \phi_n - \alpha_n K$, where K is a correction factor, $\phi_n$ is an unstripped gyro angle sampled at time $t_n$ and $\alpha_n$ is a dither angle at time $t_n$.

18. The method for determining a stripped gyro angle of claim 17 wherein the step of determining a stripped gyro angle, $\phi$ further comprises the step of increasing the dither angle by the correction factor, K, to derive a change to the correction factor K.

19. The method for determining a stripped gyro angle of claim 18 further comprising the step of increasing the change to the correction factor K by a second gain factor to obtain an updated correction factor change.

20. An apparatus for generating a dither stripper gain factor for use in a ring laser gyro, the apparatus for generating comprising:

(a) a means for providing a dither signal on a dither signal output;

(b) means for amplifying connected at an input to the dither signal output, the amplifying means having an amplified output;

(c) means for analog-to-digital conversion having an input connected to receive the amplified output and having a digital output which supplies a digital signal representative of the amplified output;

(d) means for adding gain having a first input connected to the digital output and having a gain output, the gain adding means operating so as to multiply a value of the digital output by a gain factor, wherein the means for adding gain also has a gain factor input;

(e) means for scaling having an input connected to the gain output and having a dither angle output;

(f) means for providing a nonlinearity correction connected to the dither angle output having a nonlinearity corrected dither angle output;

(g) a gain multiplier means for multiplying having an input connected to the nonlinearity corrected dither angle output and having a switched output wherein the gain multiplier means multiplies the nonlinearity corrected dither angle output to produce a gain factor correction at a gain correction factor output switch wherein a polarity of the gain correction factor is switched to follow the polarity of the dither angle output; and (h) means, connected to the gain correction factor output switch, for transferring the gain correction factor to the means for adding gain by connection to the gain factor input.

21. The apparatus for generating a dither stripper gain factor of claim 20 wherein the gain multiplier means multiplies by a first factor gain for a first time period after start of a ring laser gyro and by a second gain factor thereafter to produce an updated gain correction factor.

22. An apparatus for measuring a phase error angle for use in a ring laser gyro, the apparatus for measuring comprising:

(a) a means for providing a dither signal on a dither signal output;

(b) means for amplifying connected at an input to the dither signal output, the amplifying means having an amplified output;

(c) means for analog-to-digital conversion having an input connected to receive the amplified output and having a digital output which supplies a digital signal representative of the amplified output;

(d) means for adding gain having a first input connected to the digital output and having a gain output, the gain adding means operating so as to multiply a value of the digital output by a gain factor;

(e) means for scaling having an input connected to the gain output and having a dither angle output;

(f) means for providing an error angle correction connected to the dither angle output having an error angle corrected dither angle output and having an error angle correction input; and (g) means connected to the error angle corrected dither angle output for transferring the phase error angle to the means for providing an error angle correction.

* * * * *